(12) United States Patent
Miller

(10) Patent No.: US 8,377,301 B2
(45) Date of Patent: Feb. 19, 2013

(54) METHOD AND APPARATUS FOR TREATING DRILLING FLUID

(75) Inventor: Thomas D. Miller, Pauls Valley, OK (US)

(73) Assignee: 4 M Welding, Inc., Pauls Valley, OK (US)

( * ) Notice: Subject to any disclaimer, the term of this patent is extended or adjusted under 35 U.S.C. 154(b) by 788 days.

(21) Appl. No.: 12/335,265

(22) Filed: Dec. 15, 2008

(65) Prior Publication Data

US 2010/0147779 A1 Jun. 17, 2010

(51) Int. Cl.
- *B01D 36/02* (2006.01)
- *B01D 21/00* (2006.01)
- *B01D 21/06* (2006.01)
- *B01F 7/00* (2006.01)
- *C02F 1/00* (2006.01)

(52) U.S. Cl. ........ 210/298; 210/295; 210/312; 210/523; 210/527; 210/529; 210/803; 366/302; 366/303

(58) Field of Classification Search ................... 210/803, 210/523, 529, 527

See application file for complete search history.

(56) References Cited

U.S. PATENT DOCUMENTS

| | | | |
|---|---|---|---|
| 2,213,056 A * | 8/1940 | Skoog et al. | 366/180.1 |
| 2,756,965 A | 7/1956 | Howe | |
| 3,135,193 A * | 6/1964 | Hunt | 100/117 |
| 3,865,727 A * | 2/1975 | Broling et al. | 210/162 |
| 5,294,065 A * | 3/1994 | Harms et al. | 241/101.76 |
| 5,357,855 A | 10/1994 | Ishigaki et al. | |
| 5,368,731 A * | 11/1994 | Pesotini | 210/295 |
| 6,059,977 A | 5/2000 | Rowney et al. | |
| 6,170,580 B1 | 1/2001 | Reddoch | |
| 6,553,901 B2 | 4/2003 | Reddoch | |

* cited by examiner

*Primary Examiner* — Benjamin Kurtz

(74) *Attorney, Agent, or Firm* — Dunlap Codding, P.C.

(57) ABSTRACT

An apparatus and method for separating solids from a fluid. The apparatus includes a first container for receiving solids and fluid and a second container adjacently disposed to the first container in fluid communication therewith. The apparatus includes a conveying member extending upwardly from the bottom of the first container and angling upwardly through the second container such that the conveying member transports solids that settle to the sloped bottom portion of the first container from the first container and through the second container. A conveyor member housing may be disposed in the second container so as to provide an enclosure about the conveyor member to prevent solids that are being transported through the second container by the conveyor member from being deposited into the second container while permitting fluid that separates from the solids during transport to pass from the conveyor member housing and into the second container.

6 Claims, 6 Drawing Sheets

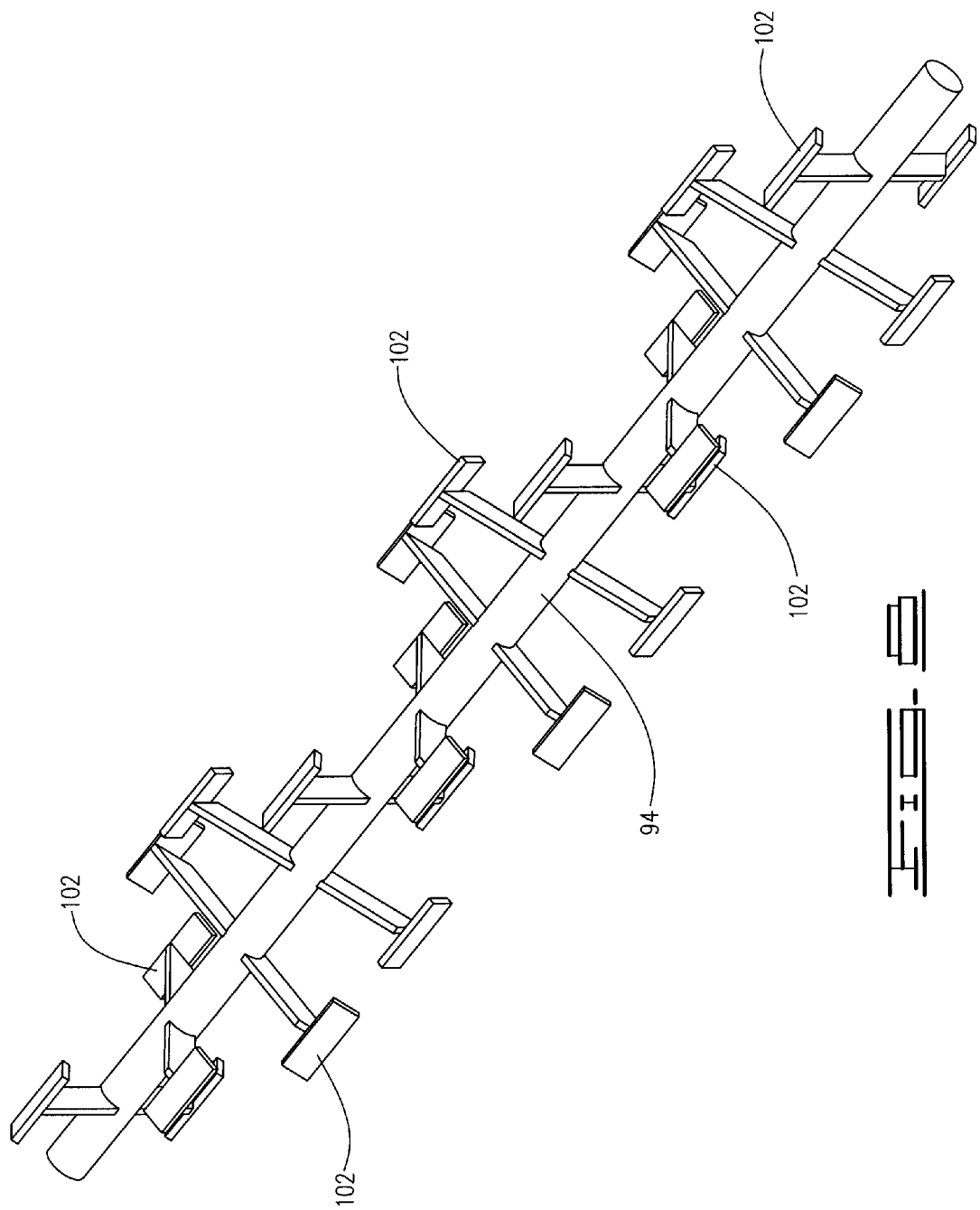

METHOD AND APPARATUS FOR TREATING DRILLING FLUID

BACKGROUND OF THE INVENTION

1. Field of the Invention

The present invention relates generally to an apparatus and method for separating solids from a fluid and more particularly, but not by way of limitation, to an apparatus for separating solids from a drilling fluid and treating the removed solids allowing for ecologically safe disposal of the solids.

2. Brief Description of Related Art

Drilling fluids are typically utilized in oil and gas drilling operations. Drilling fluids such as water, air, polymers or combinations thereof are pumped through the drill string, out of the drill bit, into the annulus that surrounds the drill string. The drilling fluid returns to the surface carrying with it crushed rock and other solids.

Special care must be taken to process the drilling fluid and solids so as to avoid pollution caused by pumping drilling fluid and solids directly into the environment. Also, separating the solids from the drilling fluid allows the rig operators to recycle the drilling fluid and lower the cost of operating the rig.

Solids are generally removed from drilling fluid by processes involving machinery known as shale shakers. Typical shale shakers comprise large, flat sheets of wire mesh or sieves of varying sizes. Drilling fluid and solids are deposited onto the wire mesh and/or sieves. The shale shakers are then vibrated to separate the solids from the drilling fluid. The drilling fluid is collected and pumped back into the well for continued use.

Although shakers remove solids from drilling fluid, a substantial amount of solids may remain suspended in the drilling fluid. Solids left in the drilling fluid can, over time, cause bridges and fill which may result in what is generally known as stuck-pipe and lost circulation. High concentrations of solids in drilling fluid may lead to drilling inefficiencies due to increased weight and viscosity of the drilling fluid which, in turn, leads to a need for increased dilution of the drilling fluid. Diluting the drilling fluid is undesirable as diluting the drilling fluid alters the viscous properties of the drilling fluid. Also, solids suspended in the drilling fluid may be detrimental to the rate of penetration of the drill bit due to increased viscosity of the drilling fluid leading to an increase in horsepower required to circulate the drilling fluid within the well. Solids which are not removed in the first pass through the shakers are re-circulated into the well where these non-removed solids are further broken down into finer sediment which is increasingly difficult to remove.

Once the solids are removed, the well operator must often contend with natural gases or other flammable material contained within the solids that pose a significant risk of explosions and fire. Therefore, solids must be stabilized with a treatment material which neutralizes the volatility of the solids. Examples of treatment material may include fly ash, lime, cement, gypsum, or combination thereof. The solids and treatment material are mixed together until fully incorporated and the mixture is then transported to a solids pit.

Due to the many steps and machinery involved in thoroughly separating solids from drilling fluid, it is common place for the separation of solids from drilling fluid to be extremely costly and time consuming. Therefore, what is needed is an apparatus and method for removing a substantial amount of solids from drilling fluid and also treats the removed solids for proper ecologically sound disposal. It is to such an apparatus that the present invention is directed.

BRIEF DESCRIPTION OF THE SEVERAL VIEWS OF THE DRAWINGS

FIG. 8 is a perspective view of an axial shaft having a plurality of paddles extending therefrom.

DETAILED DESCRIPTION OF THE INVENTION

Figure 1:
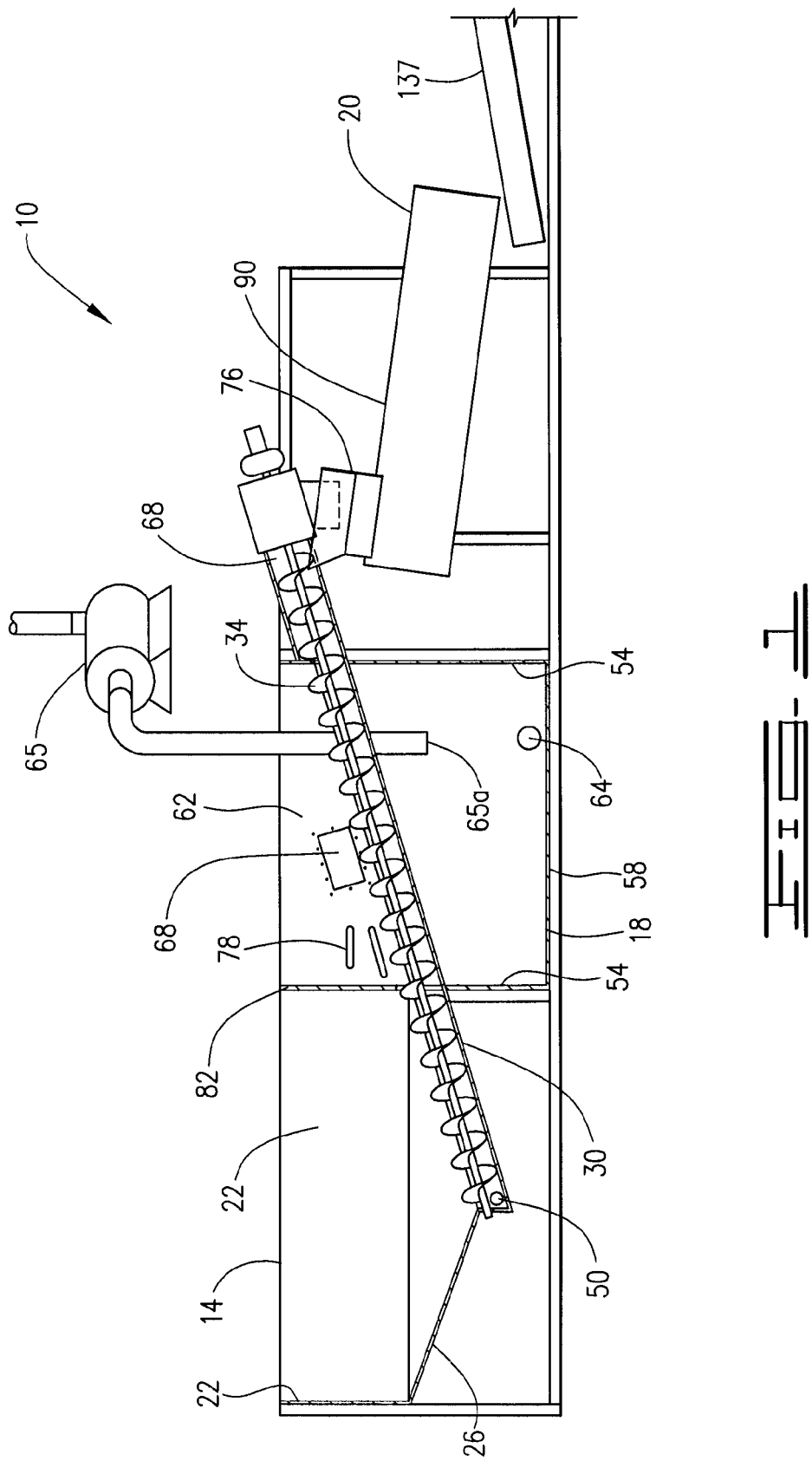
FIG. 1 is a partial cross-sectional view of an apparatus for separating solids from drilling fluid, constructed in accordance with the present invention.
Figure 2:
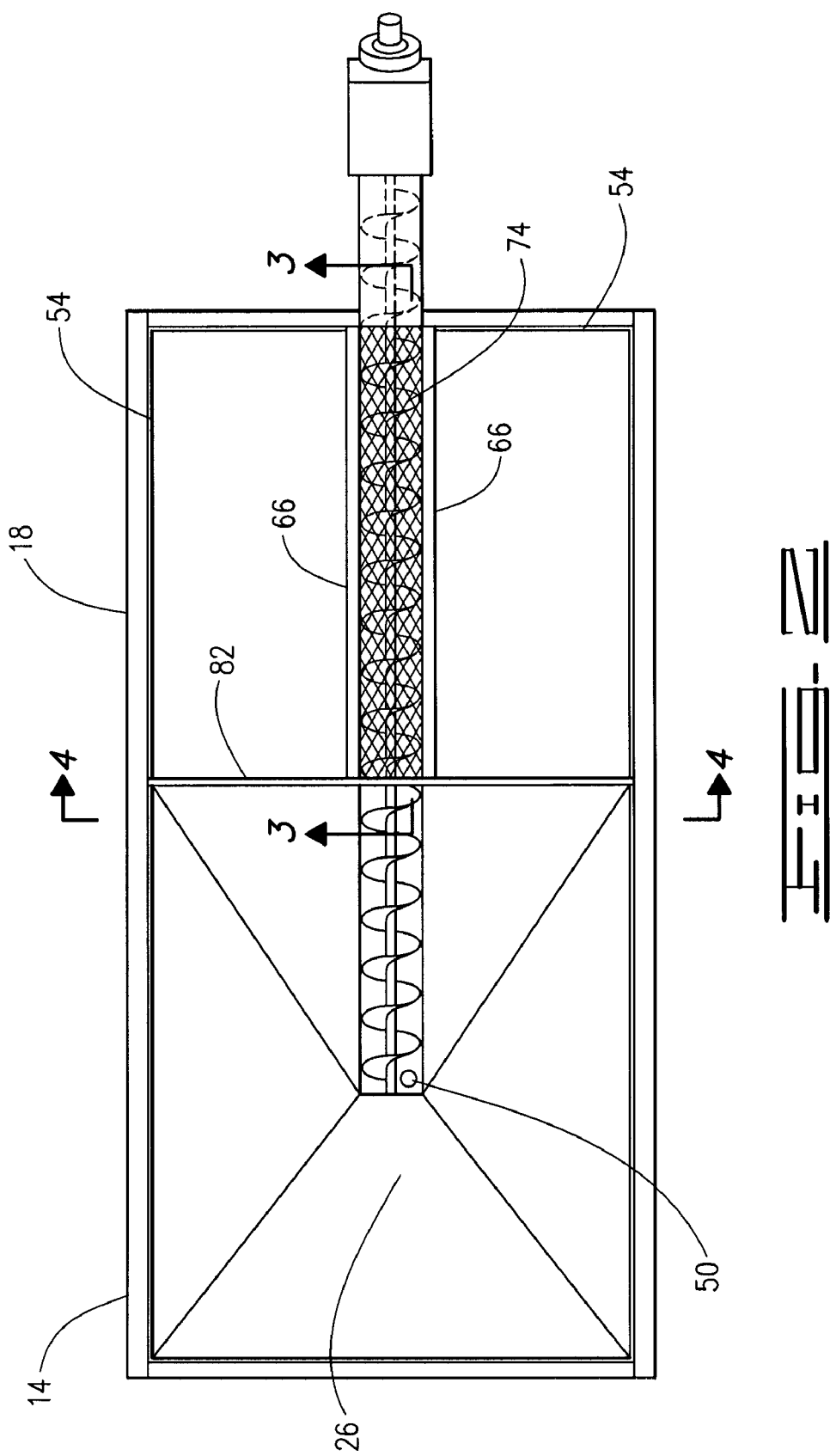
FIG. 2 is a partial top plan view of the apparatus for separating solids from drilling fluid of FIG. 1.

Referring now to the drawings, and more particularly to FIGS. 1 and 2, collectively shown therein is an apparatus 10, constructed in accordance with the present invention. Generally, the apparatus 10 includes a first container 14, a second container 18, and a treatment container 20.

The first container 14 is provided with walls 22, a sloped bottom portion 26, a conveying member trough 30 and a conveying member 34. The first container 14 is constructed of steel, although any number of other materials may likewise be utilized, for example, a resin or plastic polymer, natural material(s) such as a wood or fiber based material, metal (such as steel, titanium, aluminum or blends thereof), fiber or glass based materials and combinations thereof. The walls 22 cooperate with the sloped bottom portion 26 to form a substantially rectangular enclosure for receiving solids and drilling fluids therein. Solids will naturally separate from the drilling fluid and settle to the bottom of the first container 14. The sloped bottom portion 26 contacts the walls 22 and angle downwardly towards and adjoin the conveying member trough 30. The angled configuration of the sloped bottom portion 26 directs solids towards the conveying member trough 30.

The conveying member trough 30 is fabricated having a semi-circular cross sectional area, which is adapted to receive at least a portion of the conveying member 34. By way of non-limiting example, the conveying member trough 30 can be fabricated from a 10 inch schedule 40 pipe divided in half to form a trough. It will be understood that the conveying member trough 30 may be fabricated having differing cross sectional areas and sizes and will vary according to design requirements. The conveying member trough 30 is oriented at an upward angle of approximately 20° although other angles of inclination may also be utilized and will vary according to design requirements. Also, the conveying member trough 30 and the conveying member 34 are constructed such that they extend through the first container 14 into the second container 18. The conveying member trough 30 may optionally include an output port 50 for draining fluid from the first container 14. The output port 50 may include a mesh screen for further straining smaller sedimentary solids from the drilling fluid.

In one embodiment of the present invention, the conveying member 34 includes a screw type auger. The auger transports solids from the first container 14 upwardly through the second container 18 and outwardly to the treatment container 20. The auger is driven by a power source, such as, a hydraulic pump, internal combustion engine or electric motor. Furthermore, the auger is preferably turned at a low speed, for example, 10

RPM, in order to allow more time for drilling fluids to drain away from the solids. The rotation rate of the auger will vary according to design requirements and operational constraints, for example, the type of drilling fluid and the type and size of solids to be separated.

The second container 18 has a plurality of walls 54, a bottom floor 58, a conveying member housing 62, and an outlet port 64. The second container 18 is preferably constructed of a rigid material, such as steel. Although, it will be appreciated that any number of other materials may likewise be utilized, for example, a resin or plastic polymer, natural material(s) such as a wood or fiber based material, metal (such as steel, titanium, aluminum or blends thereof), fiber or glass based materials and combinations thereof. The walls 54 and the bottom floor 58 cooperate to form a substantially square enclosure for receiving further separated drilling fluids therein. The outlet port 64 is positioned on a lower portion, towards the bottom of at least one of the walls 54 or the bottom wall 58 and is configured so as to used as a clean out thereby permitting removal of drilling fluids and solids that may accumulate in the second container 18. A pump 65 is provided in fluid communication with the second container 18 to transfer the accumulated drilling fluid to a predetermined location, such as to a drilling fluid pit (not shown). The pump 65 has an inlet end 65a that is preferably positioned below and near the level of the apertures 86 to ensure that the pump 65 draws accumulated drilling fluid from the second container 18 without disturbing any residual solids that may settle to the bottom floor 58.

Figure 3:
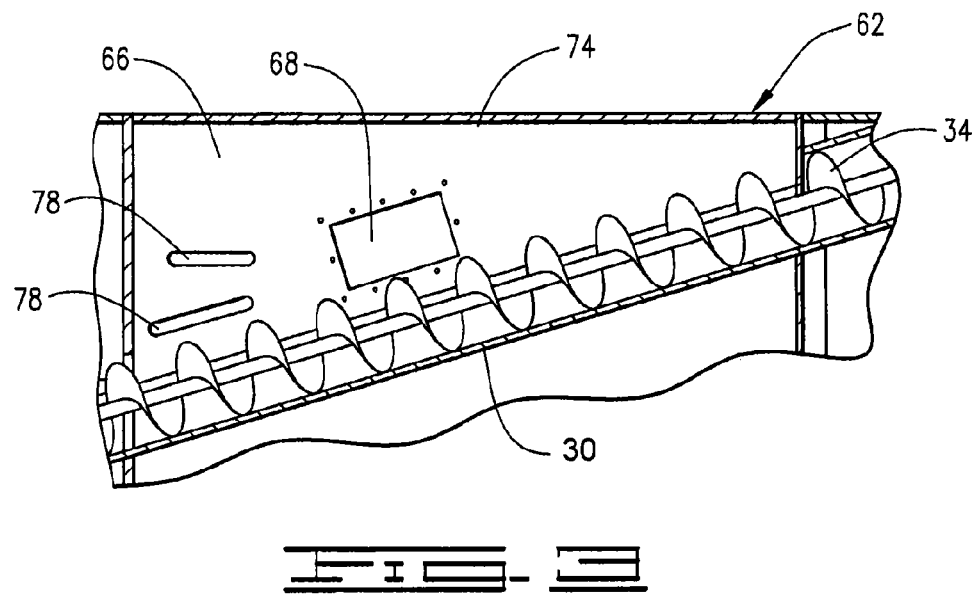
FIG. 3 is a fragmented partial cutaway view of a second container having a conveying member housing.

Referring now to FIG. 3, the conveying member housing 62 is provided with a pair of side walls 66 that cooperate with a portion of the conveying member trough 30 to enclose at least a portion of the conveying member trough 30 and a portion of the conveying member 34 that extend through the second container 18. The conveying member housing 62 isolates solids from the second container 18 as the solids are being transported from the first container 14 by the conveying member 34. The side walls 66 are preferably constructed of a steel plate, but may be constructed of any suitable material. The terminal end 68 of the conveying member housing 62 is connected to a hopper 76. It will be understood that the terminal end 68 of the conveying member housing 62 may include an extension of the conveying member housing 62 itself or, for example, a section of tubing extending beyond the second container 18 which houses the end of the conveying member 34 and connects to the hopper 76. The conveying member housing 62 may further include a top member 74, to serve as a safety cover. The top member 74 may include a plate or a grating material.

The side walls 66 are provided with at least one fluid communication member, for example, apertures 78 which allow drilling fluid which separates from the solids as the conveying member 34 acts on the solids while transporting same along the conveying member trough 30 to pass from the conveying member housing 62 into the second container 18. At least one of the walls 66 includes an access panel 68 which provides access to the inside of the conveying member housing 62 and the conveying member 34.

Figure 4:
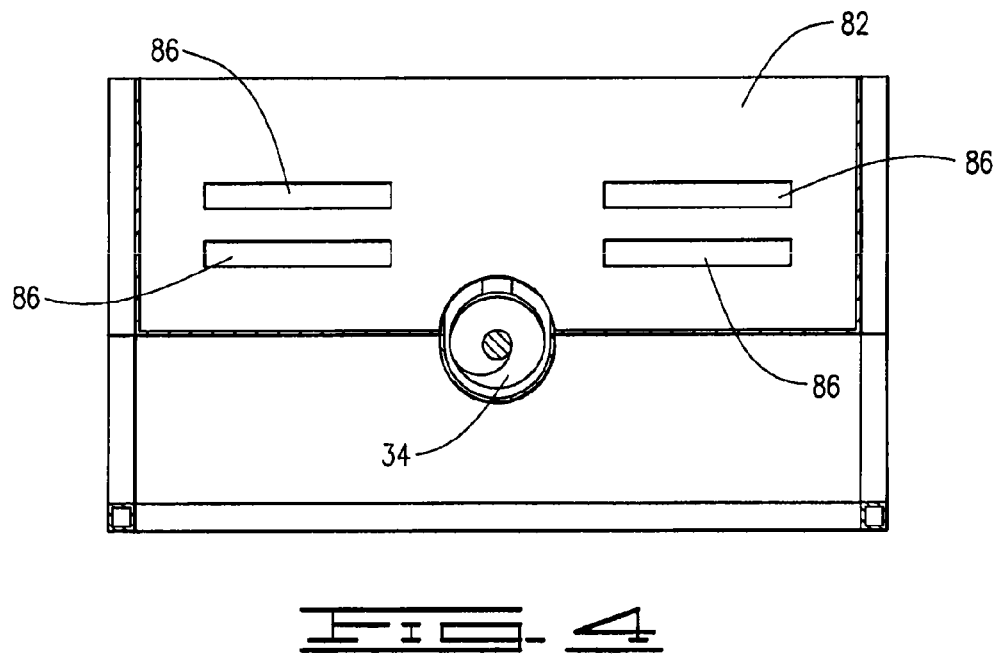
FIG. 4 is a cross-sectional view of a first container and a dividing wall.
Figure 5:
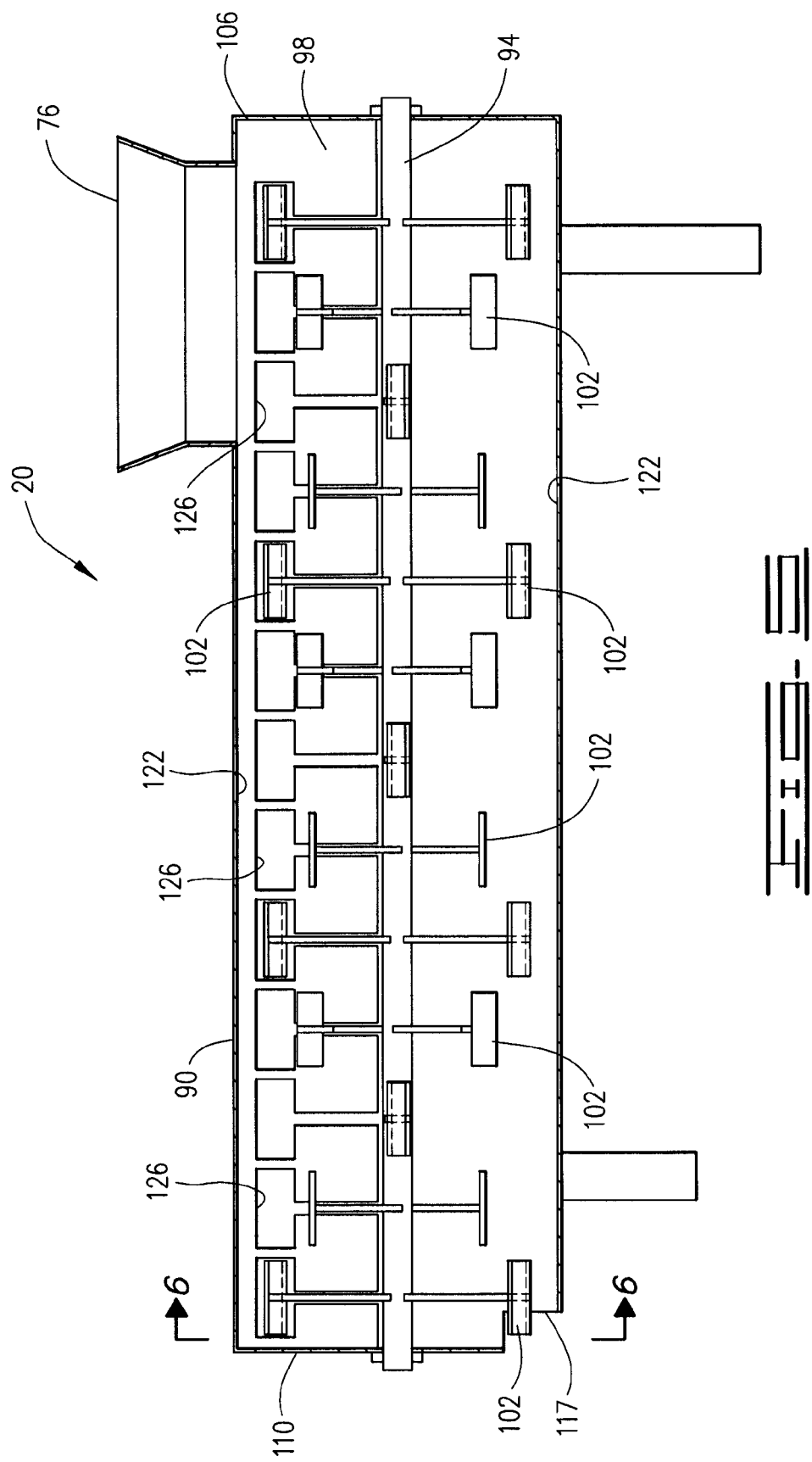
FIG. 5 is a cross sectional view of a treatment container.
Figure 6:
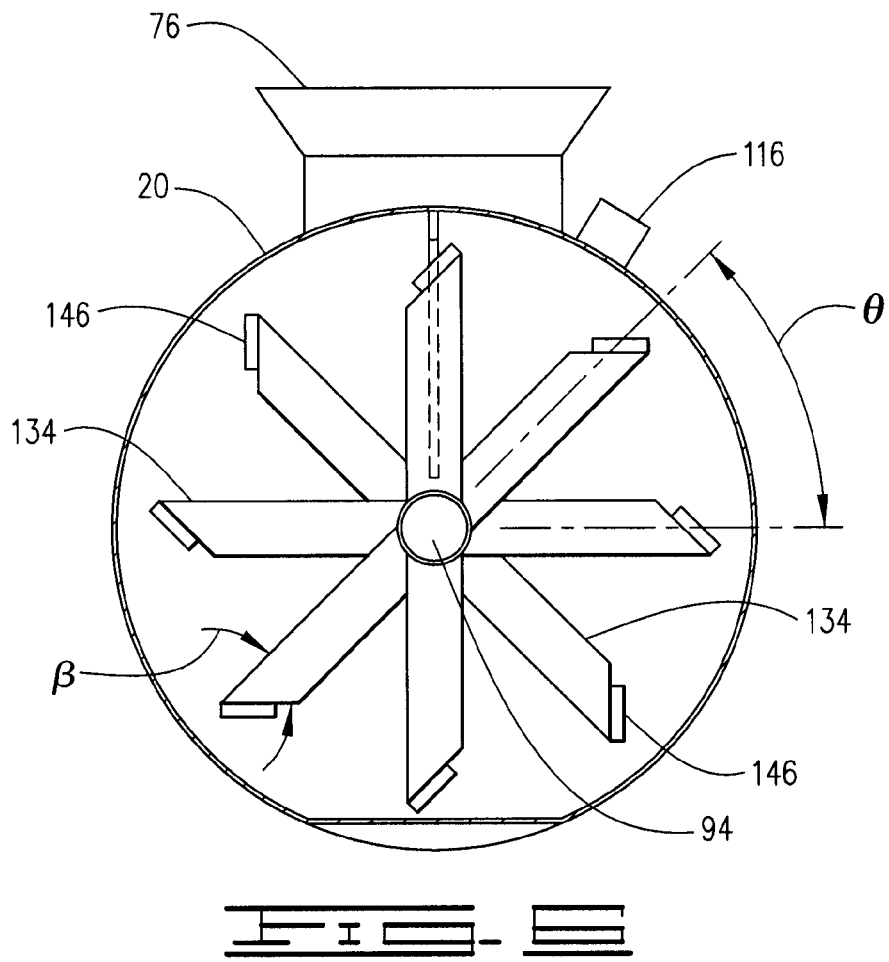
FIG. 6 is an end view of the treatment container of FIG. 5 showing the spacing of a plurality of paddles.
Figure 7:
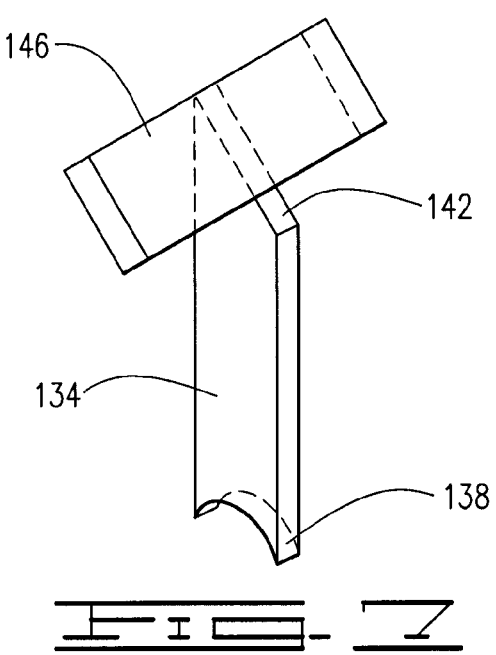
FIG. 7 is a perspective view of a paddle.

Referring now to FIGS. 1 and 4, the first container 14 and the second container 18 are adjoined by a dividing wall 82. If the level of drilling fluid within the second container 18 were to reach the height of the plurality of apertures 78 of the conveying member housing 62, drilling fluid would cease to flow out of the conveying member housing 62. Therefore, the dividing wall 82 is provided with a fluid communication member, for example, a plurality of apertures 86, two of which are positioned approximately one third of the way up the dividing wall 82 as measured from the bottom of the dividing wall 82. Also, two additional apertures 86 are positioned approximately one half of the way up the dividing wall 82 as measured from the bottom of the dividing wall 82. The plurality of apertures 86 allows fluid to pass from the first container 14 to the second container 18.

Once the solids exit the second container 18 via the conveying member 34, they are communicated into hopper 76. After the solids pass through the hopper 76 they are communicated into the treatment container 20.

Referring now to FIGS. 5-8, the treatment container 20 is provided with a housing 90, an axial shaft 94, a paddle cutout wall 98, and a plurality of paddles 102. The treatment container 20 may be constructed of steel, although any number of other materials may likewise be utilized, for example, a resin or plastic polymer, natural material(s) such as a wood or fiber based material, metal (such as steel, titanium, aluminum or blends thereof), fiber or glass based materials and combinations thereof. The housing 90 is provided with a substantially circular cross-sectional area having two ends 106 and 110. The housing 90 and two ends 106 and 110 cooperate to form a cylindrical tank. The housing 90 receives solids from the hopper 76. The housing 90 further includes an inlet port 116 which allows for the introduction of a treatment material into the housing 90 and an outlet port 117. Also, treatment material may be introduced into housing 90 via the hopper 76.

The paddle cutout wall 98 extends from the inside wall 122 of the housing 90 towards the center of the housing 90 and includes a plurality of apertures 126 constructed so as to permit passage of the plurality of paddles 102 therethrough. Larger solids are broken down as they are passed through the plurality of apertures 126 by the plurality of paddles 102. The axial shaft 94 extends through the center of the housing 90 and is rotated by a hydraulic pump (not shown). The plurality of paddles 102 are constructed having a shaft 134 which includes a first end 138 and a second end 142 and a plate 146. The first end of the shaft 134 is connected to the axial shaft 94 and the second end 142 of the shaft 134 is connected to at least a portion of the plate 146. The plate 146 is connected to the second end 142 of the shaft 134 at an angle $\beta$ relative to the shaft 134. It will be understood that the angle $\beta$ may vary according to design requirements. The plurality of paddles 102 are equally spaced linearly from one another and each of the paddles 102 extend radially from the axial shaft 94 at angular increments $\theta$, for example, 60° intervals (see FIG. 6) relative to adjacent paddles 102. It will be understood that the angular increments between the plurality of paddles may vary according to design requirements. The plurality of paddles 102 operate to mix and combine the solids with a treatment material. Once the solids have been thoroughly mixed with the treatment material, the treated solids are discharged from the housing 90 via the outlet port 117. The solids are preferably deposited on a conveyor 137, such as an auger or a belt, which carries the solids away from the housing 90 so that the solids may then be disposed of as desired.

In operation, solids and drilling fluid are deposited into the first container 14. It will be understood that prior to deposition into the first container 14, larger solids may be separated from the drilling fluid by use of a shaker system (not shown). However, it should also be understood the apparatus 10 may be used without a shale shaker. In this instance, the apparatus 10 may be considered the shale shaker itself. The drilling fluid and solids are allowed to sit in the first container 14 for a predetermined amount of time to allow solids to separate and settle out of the drilling fluid. Due to their relative greater density, the heavier solids will separate from the drilling fluid and are directed by the sloped bottom portion 26 of the first container 14 towards the conveying member trough 30 and the conveying member 34 container therein. As the auger turns and slowly communicates the solids out of the first container 14 into the adjacently disposed second container 18 through the conveying member housing 62, the drilling fluid drains away from the solids collected by the auger. The drilling fluid remaining in the first container 14 is removed via either the output port 50 of the conveying member trough 30 or removed via the top of the first container 14.

Solids communicated out of the first container 14 and into the second container 18 by the auger are contained within the conveying member housing 62 which operates not only to prevent the solids from entering the second container 18, but the smaller volume of the conveying member housing 62 relative to the first container 14 allows the solids to compact within the conveying member housing 62. The compaction of solids within the conveying member housing 62 operates to force the drilling fluid out of the conveying member housing 62 via the apertures 78 into the second container 18 where it may be discharged via the outlet port 64 of the second container 18 or via a pump. The discharged drilling fluid may be returned to a drilling fluid holding tank (not shown) where it can be reused for drilling operations.

The solids are then communicated out of the conveying member housing 62 and thus through the second container 18 and into the hopper 76. After the solids pass through the hopper 76 they are deposited into the treatment container 20. The axial shaft 94 of the treatment container 20 is turned causing the paddles 102 to combine the solids with the treatment material. Once the solids have been thoroughly treated, the treated solids are communicated through the outlet port 117 of the treatment container 20 for transportation and/or disposal.

While the apparatus 10 has been described above for use in separating solids from a drilling fluid and treating the separated solids, it should be understood that the apparatus 10 may be employed for a variety of purposes that require solids to be separated from liquids. For example, the apparatus may be used to reclaim contaminated soils. Contaminated soil may be placed in the first container 18 where a treatment material may be added to neutralize the soils. The conveying member 34 may then be used to remove the treated from the first container 18. The treatment material may in turn be discharged from the second container 18 and disposed of or recycled.

From the above description it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed is:

1. An apparatus for separating solids from a fluid, comprising:
    a first container for receiving a fluid, the first container having a sloped bottom portion;
    a second container adjacently disposed to the first container in fluid communication therewith;
    a conveying member trough extending upwardly from the sloped bottom portion of the first container and angling upwardly with a portion of the conveying member trough extending through the second container, the portion of the conveying member trough extending through the second container being non-perforated;
    a conveying member positioned in the conveying member trough such that the conveying member transports solids that settle to the sloped bottom portion of the first container from the first container and through the second container; and
    a conveying member housing including a first wall and a second wall extending upwardly from either side of the portion of the conveying member trough extending through the second container so as to cooperate with the conveying member trough to provide an enclosure about the conveying member to prevent solids that are being transported through the second container by the conveying member from being deposited into the second container, at least one of the first wall and the second wall having an aperture near an end of the second container that is nearest to the first container to permit fluid that separates from the solids during transport to pass from the conveying member housing and into the second container.

2. The apparatus of claim 1, wherein the second container is in fluid communication with the first container via a dividing wall adjoining the first container and second container, the dividing wall having at least one fluid communication port.

3. The apparatus of claim 1, further comprising a solids treatment container for receiving and treating the solids transported through the second container.

4. The apparatus of claim 3, wherein the solids treatment container comprises:
    a housing having a solids inlet and a solids outlet; and
    a shaft rotatably and longitudinally supported in the housing, the shaft having a plurality of paddles configured to mix the solids with a treatment material; and
    a paddle cutout wall radially positioned in the housing, the paddle cutout wall having a plurality of apertures corresponding to the paddles, the apertures sized and shaped to permit the paddles to pass therethrough.

5. The apparatus of claim 4, wherein the housing has a hopper for receiving the solids and an inlet port for receiving the treatment material.

6. The apparatus of claim 4 further comprising a conveyor positioned at the solids outlet of the housing for transporting treated solids away from the solids treatment container.

* * * * *